W. E. DAVIN.
BOND WIRE RETAINING NUT LOCK.
APPLICATION FILED MAR. 7, 1911.
1,008,959.
Patented Nov. 14, 1911.
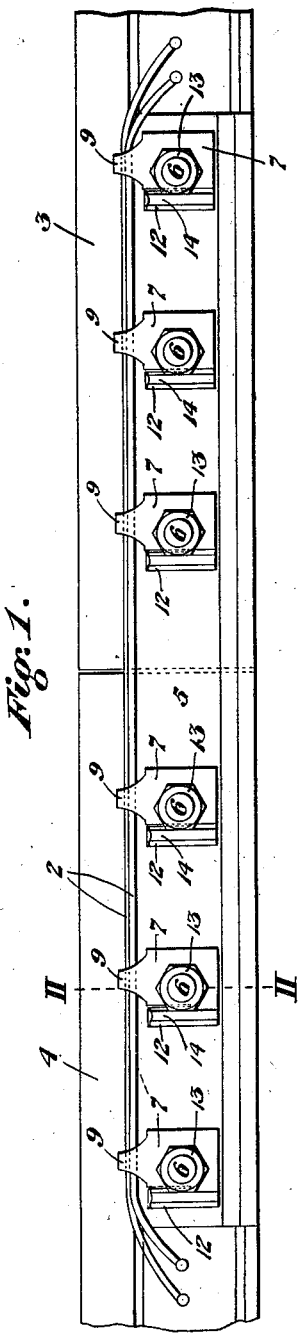
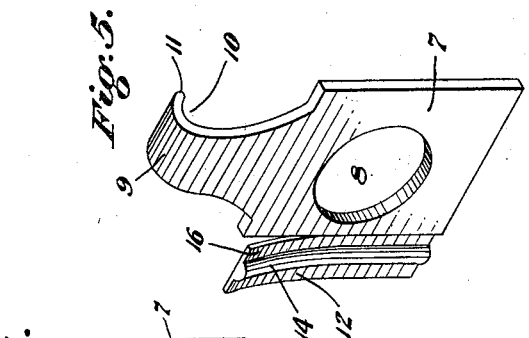
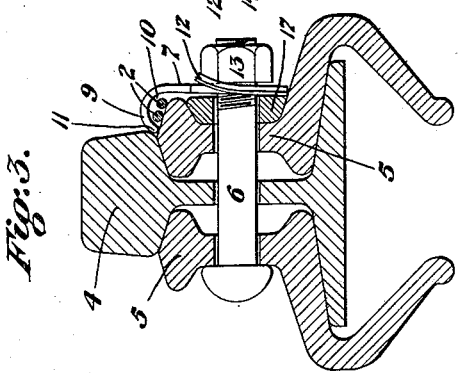
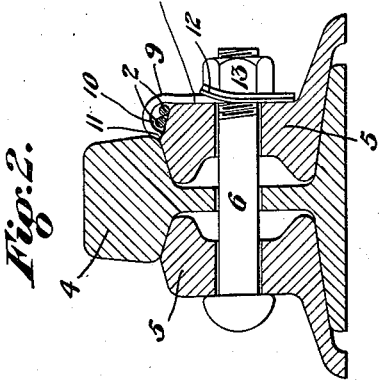
Witnesses:
Chas. S. Lipley.
Henry Sims.
Inventor
William E. Davin
by C. M. Clarke
his Attorney

UNITED STATES PATENT OFFICE.

WILLIAM E. DAVIN, OF McKEES ROCKS, PENNSYLVANIA, ASSIGNOR OF ONE-HALF TO HARVEY BARTLEY, OF PITTSBURGH, PENNSYLVANIA.

BOND-WIRE-RETAINING NUT-LOCK.

1,008,959.  Specification of Letters Patent. Patented Nov. 14, 1911.

Application filed March 7, 1911. Serial No. 612,958.

*To all whom it may concern:*

Be it known that I, WILLIAM E. DAVIN, a citizen of the United States, residing at McKees Rocks, in the county of Allegheny and State of Pennsylvania, have invented certain new and useful Improvements in Bond-Wire-Retaining Nut-Locks, of which the following is a specification.

My invention relates to improvements in nut locks and consists of a combined nut lock and keeper for securing the nut of a bolt of a rail joint and retaining the electrical bond or circuit wires in position.

The invention comprises an integral washer plate of spring metal provided with an integral element for engaging and retaining the nut and an integral element for engaging and retaining the bond wires, said elements forming portions of the washer itself.

While the invention is not restricted to the particular construction or design of either of the said elements, they are each made as integral portions of a resilient washer plate, and in the drawing I have illustrated one of the preferred forms.

The device, as to the nut locking feature, in the form shown, is similar in construction and operation to the nut locking washer disclosed in the prior patent of Bartley No. 982223 of January 17th, 1911, it being understood however, that the washer plate is preferably sufficiently resilient to provide a somewhat elastic base or bearing for the nut itself, whereby, when the nut is secured tightly in place, the washer will oppose it with considerable resistance whereby to assist in the holding of the nut in engagement with the threads.

In the drawings illustrating the invention: Figure 1 is a view in side elevation of a rail joint equipped with my invention, and showing the several locking washers in position. Fig. 2 is a cross sectional view on the line II. II. of Fig. 1. Fig. 3 is an enlarged similar sectional view showing a modified arrangement. Fig. 4 is an outer face view of the resilient nut locking washer. Fig. 5 is a perspective view of the same.

In rail joints, bond wires 2 for the circuit are ordinarily employed to transmit the current from one of the rails 3 to the adjacent connected rail 4, which rails are ordinarily connected by splice bars 5 of any suitable construction. The several connecting bolts 6 are provided at one side with the nut-locking and bond-wire-retaining washer plates 7 having a central bolt hole 8 and an outwardly projecting backwardly extending curved ear or lug 9 having an inner wire-retaining cavity 10 and a bearing terminal 11.

Integral with the plate 7 is a partly severed or partly bent resilient locking tongue 12 adapted to be engaged by one of the several straight edges of the nut 13, whereby to retain the nut against reverse movement.

In the particular construction of locking washer shown, the locking tongue 12 is extended outwardly beyond the middle transverse portion of the locking washer and is provided with a rounded rib 14 and an inwardly extending ledge 16, over which the inner edge of the nut projects and upon which it always bears.

As stated, the washer plate 7 is itself resilient, being made of a suitable spring metal as steel, and when applied in position upon the face of the splice bar 5, the terminal 11 of the bond-wire-inclosing lug 9 bears against the upper outer portion of the splice bar 5 as shown. The device thus provides an aperture through which the wires 2 pass, care being taken that the rounded or shrouded portion 9 of the washer is of sufficiently large curvature and dimensions to embrace the wires, but without direct contact or binding against them. This feature is of especial advantage in that it positively retains the wires against sagging or lateral displacement, while permitting of their easy insertion or removal in attachment to or detachment from the rails, without necessity of removal of the nuts and washers or any disturbance whatever of the rail joints.

The device is preferably so formed that in applying it to position, as indicated in Fig. 3, the terminal 11 will make contact with the splice bar before the inner face of the washer has come into contact with the outer side face of the splice bar, or with an inserted washer or filler 17, as indicated in the modified construction of Fig. 3. By this arrangement, the resilient washer will not be brought into close intimate contact with the outer face of the splice bar, or with said filler, except by considerable screwing force exerted upon the nut, so that the washer itself, due to the engagement of the terminal 11 and of the lower edge portion of the washer, will exert a very considerable outward pressure against the nut. This in itself is of effective advantage in maintaining a constant binding friction against the nut 13, whereby to, to an extent, prevent its loosening.

When the nut is screwed tightly to position, securing the several parts together with the washer plate tightly into contact with the splice bar, the nut is also positively retained against reverse rotation by the spring tongue 12, greatly assisted by the constant outward pressure of the washer plate against the nut. Thus, when the terminal of the bond-wire-retaining keeper makes contact, the spring of the washer, due to the pressure of the nut, will exert a torsional or reverse pressure in the attached integral locking tongue, whereby its action on the nut is, to an extent, in proportion to the pressure of the nut itself against the washer plate and the resulting binding action of the bond wire terminal against the splice bar.

It will be understood that the tongue 12 or other equivalent element may be of whatever design or shape whereby to positively engage against the side of the nut, and the invention is in no way restricted to the specific form of this feature.

Having described my invention, what I claim is:—

1. A combined nut locking and wire-retaining washer formed of a single piece of spring metal having a curved wire-retaining portion and a nut engaging element.

2. A combined nut locking and wire-retaining washer formed of a single piece of spring metal having a curved wire-retaining portion provided with a bearing terminal extending in one direction and a nut-engaging element extending in another direction from the washer.

3. A nut locking and wire-retaining device consisting of a flat metallic body portion having a bolt hole and an integral partly severed outwardly bent resilient locking tongue at one side and an integral backwardly bent wire-retaining tongue at another of its sides, substantially as set forth.

4. In a rail joint, the combination with the rails, splice bars, bolt and bond wires; of a nut locking and wire-retaining device consisting of a spring metal washer having an integral outwardly bent device for holding the nut and an integral oppositely bent portion for retaining the bond wires, substantially as set forth.

In testimony whereof I hereunto affix my signature in the presence of two witnesses.

WILLIAM E. DAVIN.

Witnesses:
C. M. CLARKE,
CHAS. S. LEPLEY.

---

Copies of this patent may be obtained for five cents each, by addressing the " Commissioner of Patents, Washington, D. C."